(12) United States Patent
Mathiszik et al.

(10) Patent No.: US 7,389,184 B2
(45) Date of Patent: *Jun. 17, 2008

(54) DOWNHOLE LIBRARY OF MASTER WAVELETS FOR VSP-WHILE-DRILLING APPLICATIONS

(75) Inventors: Holger Mathiszik, Wathlingen (DE); Ran Zhou, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/830,074

(22) Filed: Jul. 30, 2007

(65) Prior Publication Data

US 2007/0271038 A1 Nov. 22, 2007

Related U.S. Application Data

(63) Continuation of application No. 10/746,072, filed on Dec. 24, 2003, now Pat. No. 7,274,990.

(51) Int. Cl.
*G01V 1/40* (2006.01)
*G01V 1/28* (2006.01)

(52) U.S. Cl. ............................. 702/6; 702/14
(58) Field of Classification Search ............... 702/1–14
See application file for complete search history.

(56) References Cited

U.S. PATENT DOCUMENTS

| | | | |
|---|---|---|---|
| 3,159,232 A | 12/1964 | Fair | 181/0.5 |
| 3,701,968 A | 10/1972 | Broding | 340/17 |
| 3,727,717 A | 4/1973 | Miller | 181/0.5 VM |
| 4,739,858 A | 4/1988 | Dragoset, Jr. | 181/115 |
| 4,918,668 A | 4/1990 | Sallas | 367/22 |
| 4,926,391 A * | 5/1990 | Rector et al. | 367/41 |
| 5,963,138 A | 10/1999 | Gruenhagen | 340/679 |
| 6,023,444 A * | 2/2000 | Naville et al. | 367/82 |
| 6,078,868 A | 6/2000 | Dubinsky | 702/6 |
| 6,247,542 B1 | 6/2001 | Kruspe et al. | 175/40 |
| 6,837,105 B1 | 1/2005 | DiFoggio et al. | 73/152.46 |
| 6,917,564 B2 * | 7/2005 | Leaney | 367/73 |
| 7,274,990 B2 * | 9/2007 | Mathiszik et al. | 702/6 |

* cited by examiner

*Primary Examiner*—John E Barlow, Jr.
*Assistant Examiner*—Victor J Taylor
(74) *Attorney, Agent, or Firm*—Madan, Mossman & Sriram, P.C.

(57) ABSTRACT

A controllable seismic source is used in a seismic-while-drilling system for obtaining VSP data. Coded information is sent downhole about the signal generated by said controllable source. The information about the seismic source is used for reconstructing the source waveform and processing the VSP data. Optionally, a reference signal measured at one depth of the BHA is used for processing of signals at subsequent depths.

11 Claims, 6 Drawing Sheets

DOWNHOLE LIBRARY OF MASTER WAVELETS FOR VSP-WHILE-DRILLING APPLICATIONS

CROSS REFERENCE TO RELATED APPLICATIONS

This application is a continuation of U.S. patent application Ser. No. 10/746,072, filed Dec. 24, 2003, now U.S. Pat. No. 7,274,990.

BACKGROUND OF THE INVENTION

1. Field of the Invention

The present invention relates to an improved method of determining, while drilling in the earth with a drill bit, the positions of geologic formations in the earth. More particularly, it relates to a method for improving the quality of a reference signal.

2. Description of the Related Art

Conventional reflection seismology utilizes surface sources and receivers to detect reflections from subsurface impedance contrasts. The obtained image often suffers in spatial accuracy, resolution and coherence due to the long travel paths between source, reflector, and receiver. In particular, due to the two way passage of seismic signals through a highly absorptive near surface weathered layer with a low, laterally varying velocity, subsurface images are poor quality. To overcome this difficulty, a technique commonly known as vertical seismic profiling (VSP) was developed to image the subsurface in the vicinity of a borehole. With VSP, a surface seismic source is used and signals are received at a single downhole receiver or an array of downhole receivers. This is repeated for different depths of the receiver (or receiver array). In offset VSP, a plurality of spaced apart sources are sequentially activated, enabling imaging of a larger range of distances than is possible with a single source In reverse VSPs, the positions of the source and receivers are interchanged, i.e., a downhole source is used and recording is done at a surface receiver or array of receivers. A particular example of such a system is one developed by Western Atlas International Inc. and used with the service mark TOMEX®. In this, the drillbit itself is used as the seismic source. One of the problems with using a drillbit as a seismic source is that the source is not repeatable. As would be known to those versed in the art, analysis of VSP data preferably uses of a repeatable source so that any waveforms changes in the VSP data may be attributable to formation properties. With the drillbit as a seismic source, this is difficult. Hence it would be desirable to properly compensate for source variations prior to analysis of the VSP data.

A problem with proper compensation for source variations is that telemetry capability in a drilling environment is extremely limited, so that sending the characterizing information about the source wavelet to the surface is not possible. U.S. Pat. No. 6,078,868 to Dubinsky, having the same assignee as the present application and the contents of which are fully incorporated herein by reference, teaches a method for making seismic while drilling (SWD) measurements in which a reference signal downhole near the drill bit is analyzed, and information about the signal is sent to the surface using a limited number of transmission bits. In one embodiment, a library of anticipated drill bit wavelets is stored in memory downhole and in memory at the surface. This library of anticipated drill bit wavelets is based on long term experience (several years) as well as theoretical considerations in collecting drill bit signals downhole and, in fact, could also be considered a data base of these collected drill bit signals. The best matching wavelet is identified by the processor downhole and then a code identifying the wavelet and a scaling factor are sent to the surface. At the surface, the best matching wavelet is retrieved based on the code received and then a reconstructed signal is created using the retrieved wavelet and the scaling factor. In another embodiment, key characteristics of the signal such as central frequency, frequency band, etc., are calculated downhole and transmitted to the surface. These key characteristics are then used to reconstruct the reference signal which is then used for correlation of surface detected signals. Once this correlation is done, the data are analyzed at the surface using known techniques.

The Dubinsky patent addresses the problem of telemetry of source wavelets to the surface in the context of a reverse VSP. The present invention is a modification of the apparatus and method of Dubinsky in the context of a conventional VSP, i.e., source at the surface and receiver downhole. There are other differences between the method and apparatus of the present invention and the teachings of Dubinsky. These are discussed below.

SUMMARY OF THE INVENTION

In a system and method of seismic surveying of an earth formation, a seismic wave is generated using a controllable source at a first location for propagating a seismic wave through said earth formation. A downhole receiver is used for receiving a first signal indicative of the propagating seismic wave. A second signal indicative of a character of the generated seismic wave is transmitted to the downhole location. The first signal is then processed using the second signal. The first location may be at or proximate to the surface of a body of water of land. Alternatively, the first location may be in a preexisting wellbore. The method received signal may be a direct signal or a reflected signal. Compressional or shear seismic signals may be generated.

The second signal may be a parameter of the control signal for the controllable source. Alternatively, the second signal is based at least in part on a signal measured by a reference detector proximate to the source location. The source may be a swept frequency source. Alternatively, the source may be an airgun array. Using measurements made at different depths, an attenuation factor may be derived from the direct arrival. When measurements are made at a plurality of depths, a vertical seismic profile (VSP) may be obtained.

In another embodiment of the invention, a seismic wave is generated at or near a surface location. Signals received by a receiver on a bottomhole assembly (BHA) at a shallow depth define a reference wavelet. This reference wavelet is then used for determining arrival times of direct signals at increasing depths of the BHA. The reference wavelet may be updated at each depth.

BRIEF DESCRIPTION OF THE DRAWINGS

The present invention is best understood with reference to the accompanying figures in which like numerals refer to like elements, and in which.

DETAILED DESCRIPTION OF THE INVENTION

Figure 1:
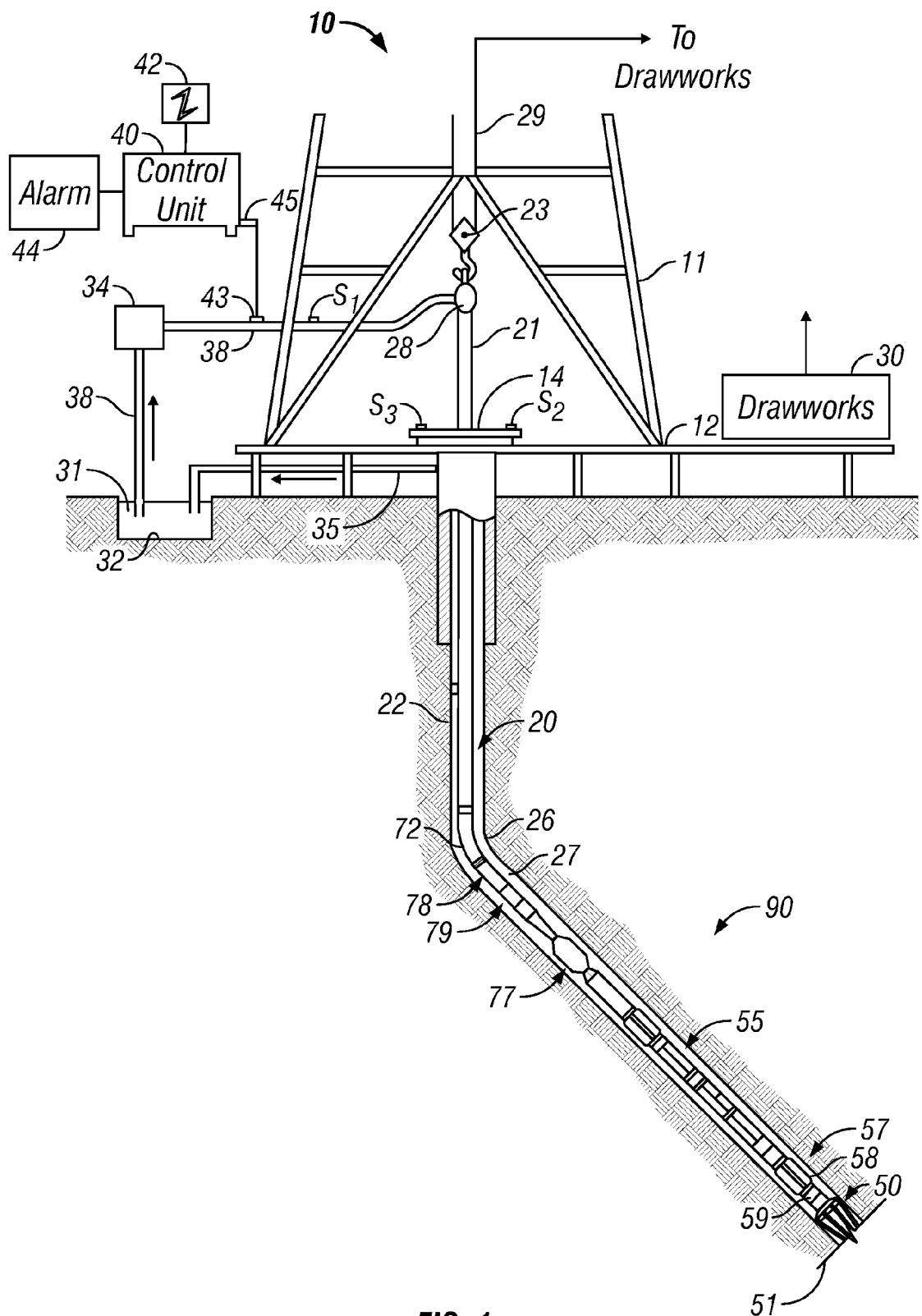
FIG. 1 (Prior Art) shows a measurement-while-drilling device suitable for use with the present invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ placed in the line 38 can provide information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In one embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters can include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor at a suitable location (not shown) in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 can include a computer or a microprocessor-based processing system, memory for storing programs or models and data, a recorder for recording data, and other peripherals. The control unit 40 can be adapted to activate alarms 44 when certain unsafe or undesirable operating conditions occur.

The apparatus for use with the present invention also includes a downhole processor that may be positioned at any suitable location within or near the bottom hole assembly. The use of the processor is described below.

Figure 2:
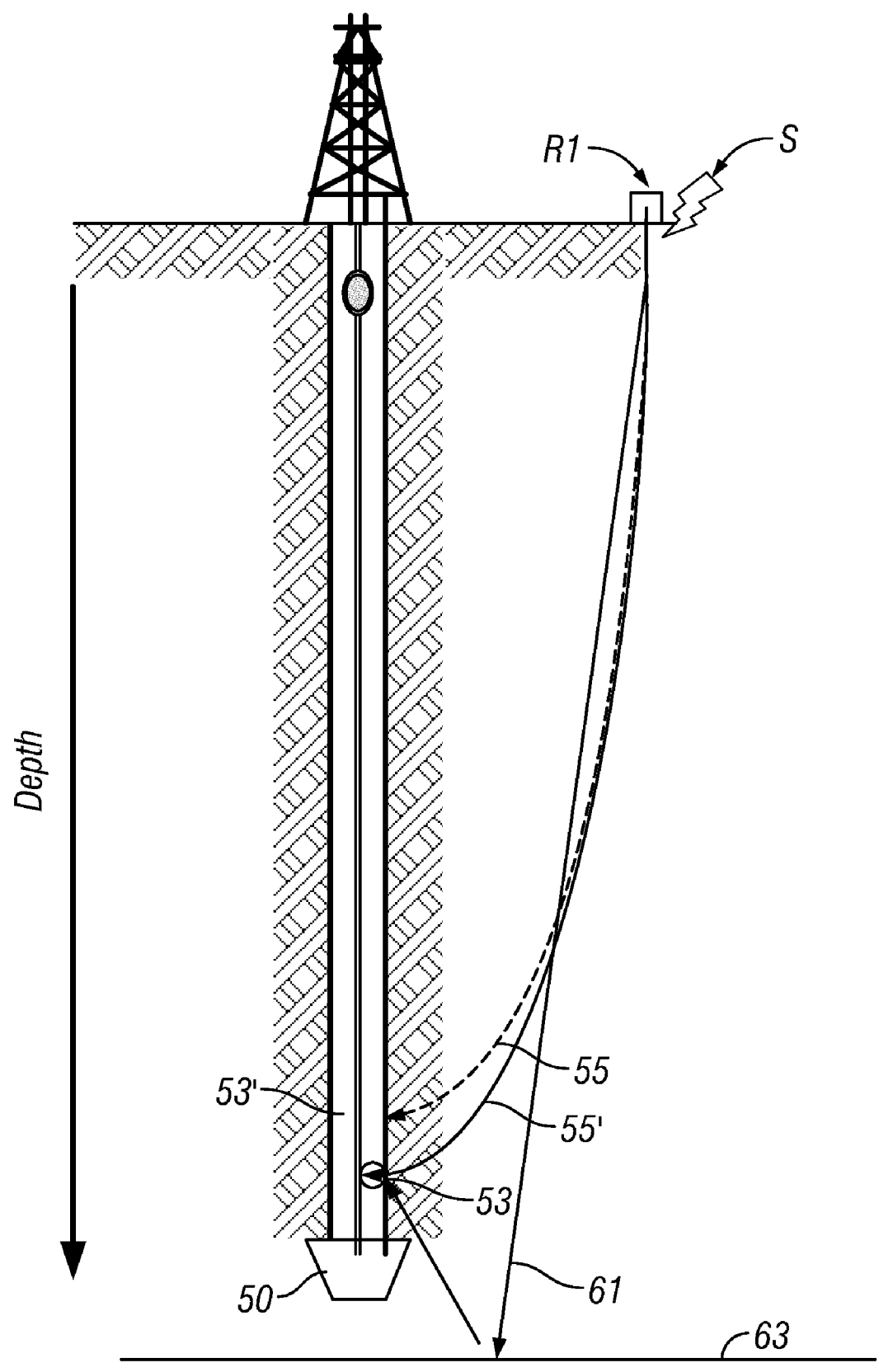
FIG. 2 illustrates the arrangement of source and sensors for the present invention.

Turning now to FIG. 2, an example is shown of source and receiver configurations for the method of the present invention. Shown is a drillbit 50 near the bottom of a borehole 26'. A surface seismic source is denoted by S and a reference receiver at the surface is denoted by R1. A downhole receiver is denoted by 53, while 55 shows an exemplary raypath for seismic waves originating at the source S and received by the receiver 53. The receiver 53 is usually in a fixed relation to the drillbit in the bottom hole assembly. Also shown in FIG. 2 is a raypath 55' from the source S to another position 53' near the bottom of the borehole. This other position 53' could correspond to a second receiver in one embodiment of the invention wherein a plurality of seismic receivers are used downhole. In an alternate embodiment of the invention, the position 53' corresponds to another position of the receiver 53 when the drillbit and the BHA are at a different depth.

Raypaths 55 and 55' are shown as curved. This raybending commonly happens due to the fact that the velocity of propagation of seismic waves in the earth generally increases with depth. Also shown in FIG. 2 is a reflected ray 61 corresponding to seismic waves that have been produced by the source, reflected by an interface such as 63, and received by the receiver at 53.

Figure 3:
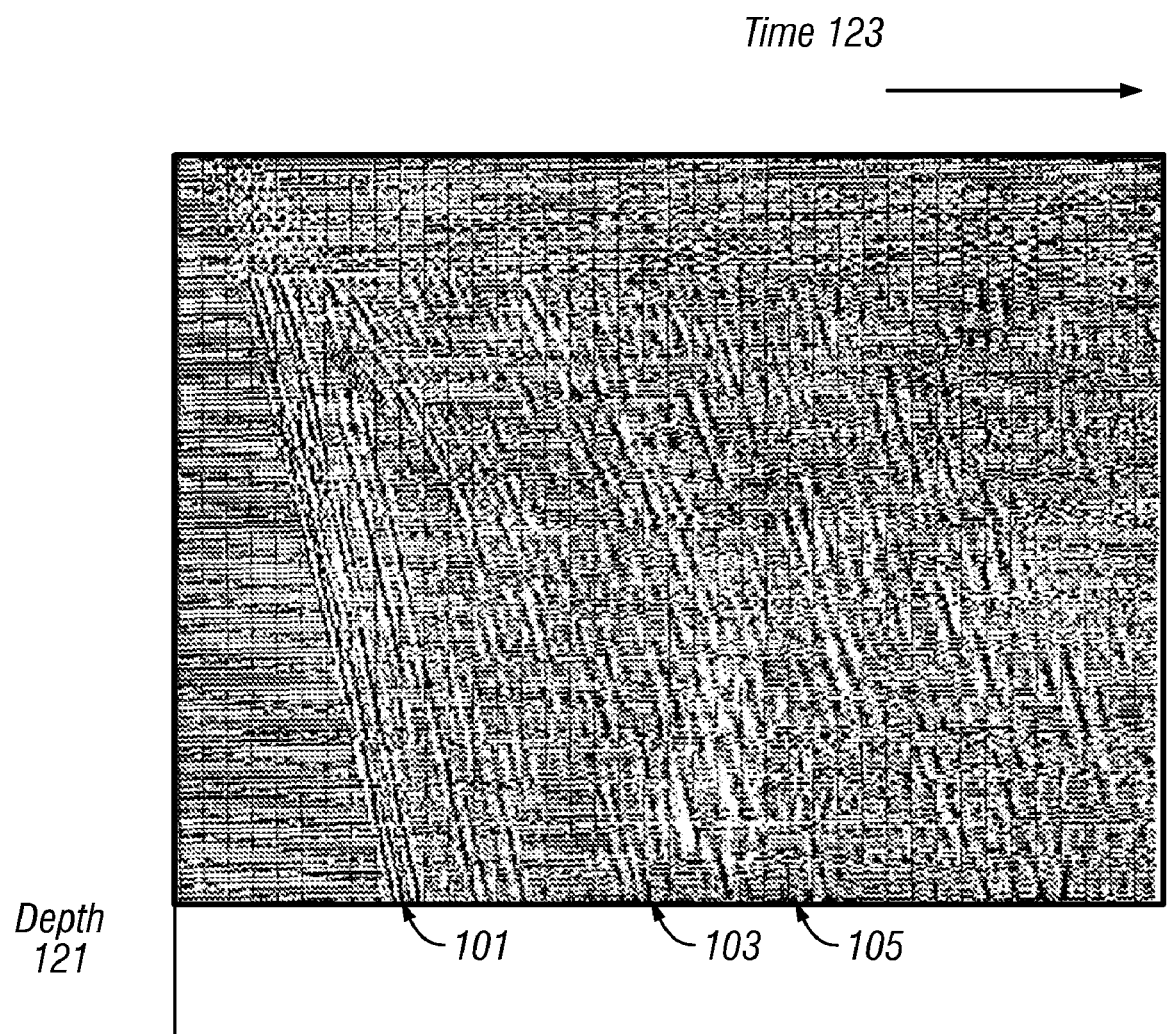
FIG. 3 (Prior Art) shows an example of a vertical seismic profile.

An example of a VSP that would be recorded by such an arrangement is shown in FIG. 3. The vertical axis 121 corresponds to depth while the horizontal axis 123 corresponds to time. The exemplary data in FIG. 3 was obtained using a wireline for deployment of the receivers. Measurements were made at a large number of depths, providing the large number of seismic traces shown in FIG. 3.

Even to an untrained observer, several points are apparent in FIG. 3. One point of interest is the direct compressional wave (P-wave) arrival denoted by 101. This corresponds to energy that has generally propagated into the earth formation as a P-wave. Also apparent in FIG. 3 is a direct shear wave (S-wave) arrival denoted by 103. Since S-waves have a lower velocity of propagation than P-waves, their arrival times are later than the arrival times of P-waves.

Both the compressional and shear wave direct arrivals are of interest since they are indicative of the type of rock through which the waves have propagated. To one skilled in the art, other visual information is seen in FIG. 3. An example of this is denoted by 105 and corresponds to energy that is reflected from a deeper horizon, such as 63 in FIG. 2 and moves up the borehole. Consequently, the "moveout" of this is opposite too the moveout of the direct arrivals (P- or S-). Such reflections are an important part of the analysis of VSP data since they provide the ability to look ahead of the drillbit.

Figure 4:
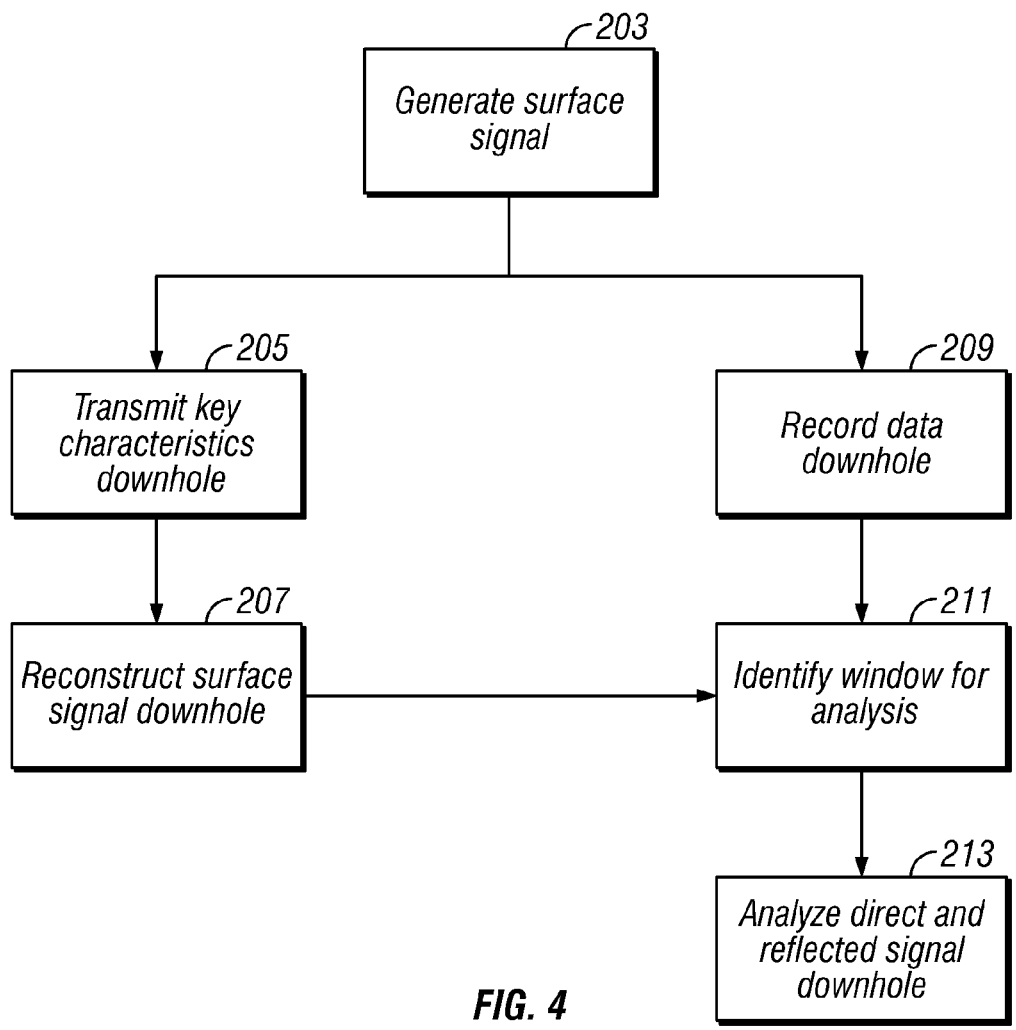
FIG. 4 shows a flow chart of processing carried out with one embodiment of the present invention.

Turning now to FIG. 4, a flow chart of an embodiment of the method of the present invention is shown. A surface signal is generated 203. As in any VSP acquisition, there are a number of choices available for sources used in data acquisition. Broadly speaking, there are two types of sources: impulsive, and non-impulsive. In a marine environment, a commonly used impulsive source is an airgun or an airgun array. An airgun is a device with relatively low energy (in contrast to high energy explosive sources such as dynamite). Low energy sources such as airguns are used for several reasons, including reduced injury to marine life, and for safety issues. A single airgun produces an air bubble that produces continued pulsing and is hence not desirable for VSP data acquisition: the continued oscillations result in a fairly narrow spectral bandwidth that makes it difficult to accurately pick the arrival time of a seismic signal. For this reason, air gun arrays with a reasonably broad bandwidth are commonly used in marine data acquisition. With the use of air gun arrays comes the flexibility of spectrally tuning the air gun array to obtain a desirable bandwidth and to maximize the signal level at the receiver. An example of a tunable airgun array is given in U.S. Pat. No. 4,739,858 to Dragoset.

A non impulsive source that has been used for marine seismic data acquisition is a marine vibrator. Marine vibrators have a long history in seismic data acquisition. More recent developments, such as that disclosed in U.S. Pat. No. 4,918,668 to Sallas include the a tunable array of marine vibrators. In vibratory surveys, the source sends out a low power swept-frequency signal with a duration of the order of ten to twenty seconds. The received signal is cross-correlated with the the sweep signal (or a signal related to the sweep signal) to recover the impulse response of the earth. Processing of marine vibratory data in conventional surface seismic data acquisition requires a Doppler compensation for the motion of the source. This is not a problem with VSP data acquisition carried out at a fixed source location. However, if an offset-VSP survey is carried out with a moving source, Doppler correction is necessary. Doppler compensation methods have been discussed, for example, in U.S. Pat. No. 4,809,235 to Dragoset et. al.

Use of vibrators as a seismic source for land seismic surveys has an equally long history. U.S. Pat. No. 3,701,968 to Broding and U.S. Pat. No. 3,727,717 to Miller disclose the use of vibrators with vertical motion suitable for use as compressional wave sources. U.S. Pat. No. 3,159,232 to Fair discloses the use of a horizontal vibrator for generation of shear wave energy.

A common characteristic of the sources described above is that the output signal is controllable in terms of directionality and, particularly, the frequency spectrum. In this sense, the seismic sources are controllable. The ability to control the spectral characteristics is used in one embodiment of the invention discussed below.

The downhole detectors used in the present invention typically include one or more of hydrophones, geophones, or accelerometers. Hydrophones are sensitive to pressure variations and as such, do not require coupling to the earth formation. The performance of the other sensors (geophones and accelerometers) is improved if there is good coupling with the earth formation. When these sensors are on the BHA, coupling may be difficult to achieve. In one embodiment of the invention, the downhole detectors are mounted on a non-rotating sleeve that may be clamped to the borehole wall. Such a non-rotating sleeve is disclosed in U.S. Pat. No. 6,247,542 to Kruspe et al., having the same assignee as the present invention and the contents of which are fully incorporated herein by reference. When used for shear-wave VSPs, it is particularly important to have sensors that are responsive to horizontal motion, i.e., x- and y-component geophones or accelerometers (in a vertical borehole) since a vertically propagating shear wave has little or no vertical motion. When a P-wave VSP is being conducted, it is not necessary to have the sensors in a fixed position. Hydrophones are omnidirectional in their sensitivity and can be used on a rotating sensor for receiving P-wave signals downhole.

Another consideration is that with swept frequency sources, the response of the downhole x- and y-sensors to an arriving a shear wave signal will depend upon the orientation of the sensors. If the sensors are rotating with the BHA, it is necessary to know the orientation of the sensors during the data acquisition. This can be done using magnetometers and/or accelerometers. The received signals must be corrected (using a straightforward rotation of coordinates) for the orientation prior to further processing and this capability is part of the downhole processor. On the other hand, if the sensors are on a non-rotating sleeve, this continuous correction is not needed.

It should be noted that with a source at the surface and downhole detectors, the number of parameters needed to characterize the source wavelet (and the possible suite of possible wavelet shapes) is less than for the problem addressed by Dubinsky. In Dubinsky, the drillbit itself acts as a seismic source, and even in the simplest situations, the output seismic signals are dependent upon many parameters such as the earth formations being drilled, the weight on bit, the torque applied at the drill string. The source wavelet would be further dependent upon the drilling mode (possible whirl, sticking of the drillbit, etc.). On the other hand, the receiver for the present invention is in a much more noisy environment due to its proximity to the drillbit. In one embodiment of the present invention, an attenuator is used for attenuating noise Returning to FIG. 2, activation of the source results in propagation of a seismic waves into the earth formation (as depicted by the rays 55, 55', and 61). The resulting data are received by the downhole detector(s) and may be stored on a suitable memory device downhole. A reference detector R1 may be used to measure the downgoing signal, and key characteristics of the generated signal are transmitted downhole 205. This telemetry may be accomplished, for example, by using mud pulse telemetry such as that disclosed in U.S. Pat. No. 5,963,138 to Gruenhagen. When a reference detector is used in land VSP surveys, it could be a buried detector (geophone, hydrophone or accelerometer). When a reference detector is used in marine VSP surveys, it could be a hydrophone within the water layer, or it could be a detector buried in the sub-bottom.

Figure 5:
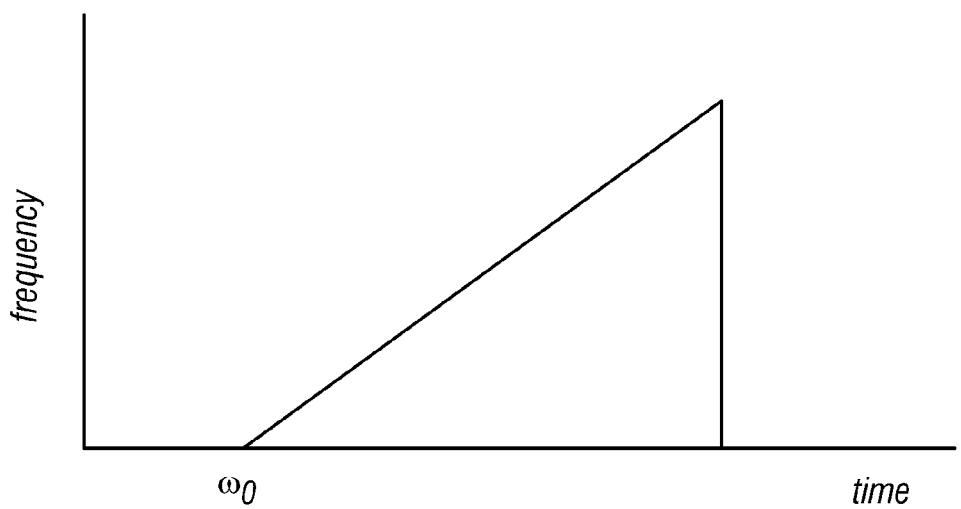
FIG. 5 shows an example of a frequency spectrum of the output of a swept frequency source.

With a swept frequency source, the most commonly used sweep is a linear sweep in which the instantaneous frequency is given by an expression of the form:

$$\omega = \omega_0 + At \quad (1)$$

where $\omega_0$ is the initial angular frequency, $\omega$ is the frequency at time t, and A is the rate of change of the angular frequency with time. The amplitude of the sweep typically includes a middle portion where the amplitude is uniform, and an earlier and later taper to zero amplitude. This is illustrated schematically in FIG. 5.

When a linear frequency sweep is used, the key characteristics of the source signal that are transmitted downhole are the initial frequency $\omega_0$, the sweep rate A and the duration of the sweep. Those versed in the art would recognize that essentially the same information could be conveyed by the total time of the sweep, and the initial and ending frequencies. Other equivalent formulations may also be used. In addition, the key characteristics would include information pertaining to the amplitude taper rate from FIG. 5. The point to note is that the source signal can be characterized by a limited number of characteristics, so that transmitting the information downhole is feasible within the limited telemetry capabilities of the telemetry system.

Once this key information about the source characteristics has been transmitted downhole, the downhole processor can reconstruct the source signal. Another piece of information that is transmitted downhole is the start time of the signal. In one embodiment of the invention, a rubidium clock is used for maintaining synchronization between the surface seismic source and the downhole processor. Such a rubidium clock is disclosed in a U.S. Pat. No. 6,837,105 to DiFoggio et al. having the same assignee as the present invention and the contents of which are fully incorporated herein by reference.

Those versed in the art would recognize that the earth is a dissipative medium that selectively absorbs higher frequencies. A commonly used model characterizes the earth by a quality factor Q. The quality factor may be a slowly varying function of depth depending upon the formation lithology and fluid content. With such a model, the propagation wave number of a seismic wave propagating in the z-direction can be written as:

$$k_z = \left(\frac{\omega}{V} + i\alpha\right) \quad (2)$$

where $k_z$ is the wave number, $\omega$ is the angular frequency, V is the phase velocity, and $\alpha$ is the attenuation factor. The attenuation factor a is related to the quality factor Q by $$\alpha = \frac{\omega}{2QV}. \quad (3)$$

A commonly used approximation relates the velocity V to a reference velocity $V_r$ at angular frequency $\omega_r$ by a relation of the form:

$$\frac{V_r}{V} \cong 1 - \frac{1}{\pi Q}\ln\left(\frac{\omega}{\omega_r}\right) \quad (4)$$

Using eqns (2)-(4) and the key characteristics of the source signal transmitted downhole, the waveform of the seismic signal can be reconstructed. The time of source activation is used to define the window for analysis 211 of the data downhole. The reconstructed waveform may be used as a filter for processing the recorded data 209 for further analysis 213 using known methods for processing the VSP data.

Figure 6:
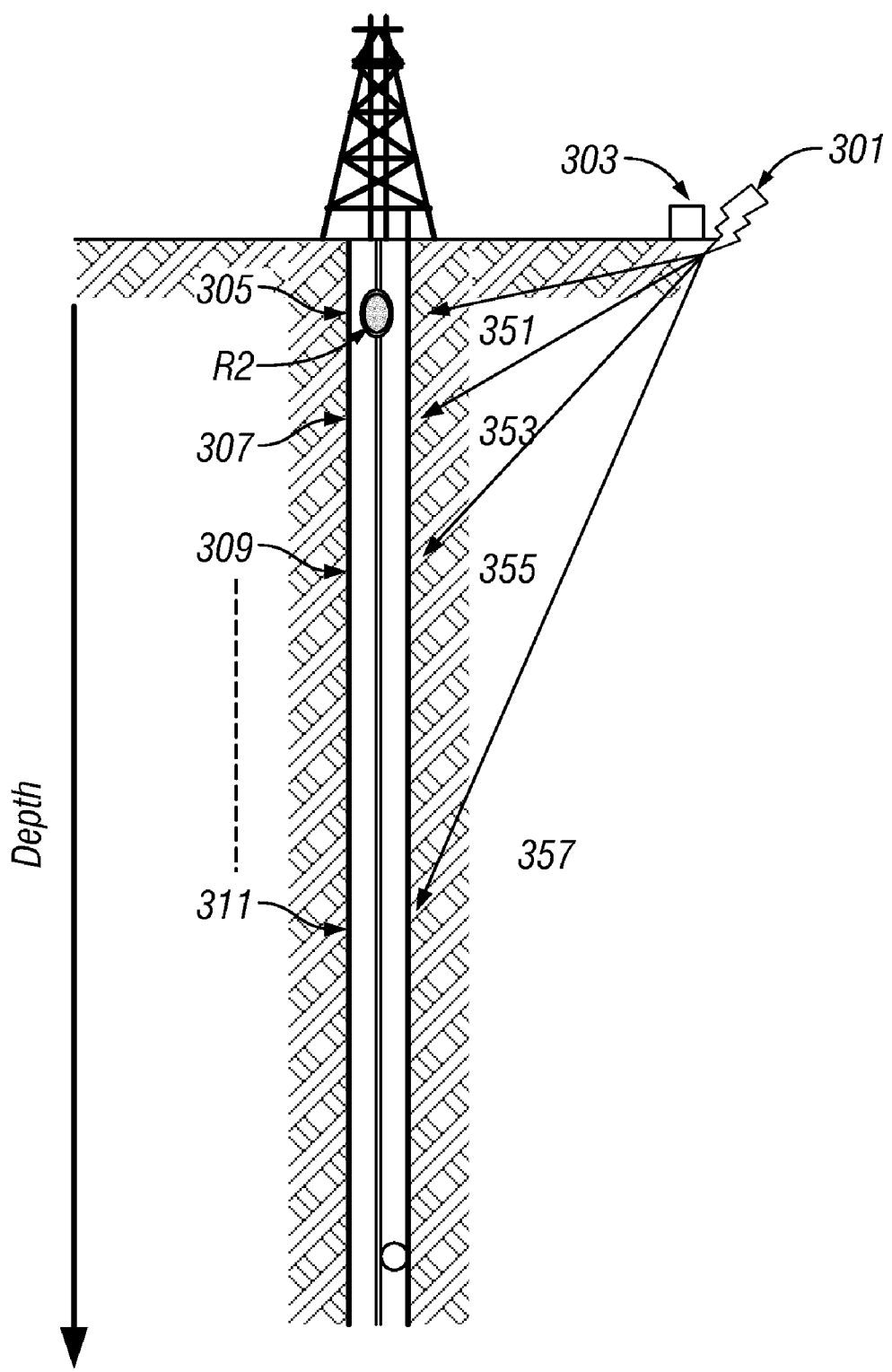
FIG. 6 schematically illustrates the layout for a second embodiment of the present invention.

Using the concepts discussed above, an exemplary use of the invention is discussed next with reference to FIG. 6. In a VSP-type measurement, a seismic signal generated by a reproducible standard surface seismic source 301 like an air gun or a vibrator is recorded while drilling by means of multiple downhole acoustic sensitive sensors (geophones, accelerometers, hydrophones). The source wavelet is registered on the surface by means of a near-source receiver 303. In FIG. 6, the receiver 305 is shown on the surface of the earth, but it could be buried (in land), in the water or in the sub-bottom (for marine recording).

Starting at an initial depth such as 305 while drilling ahead, the seismic signal generated by the source may be recorded. This may be done at a shallow depth and within an acoustic "silent" environment so that the wavelet is a fair representation of the outgoing signal from the source. From the known source wavelet (either predetermined, or telemetered downhole) an attenuation factor a for the raypath 351 may be determined.

At the next depth level 307, a second measurement cycle is performed. Due to the greater depth and the increased noise level caused by the drilling process, the signal is much more attenuated and distorted at this level than when the receiver is at 305. Now the previously identified wavelet from depth 305 nay be used to determine the first arrival time of the new measurement cycle by means of cross-correlation or similar techniques. The wavelet is then identified within the seismic trace of the actual measurement based on the received signal following the first arrival time. In one embodiment of the invention, an attenuation factor a is determined from a comparison of the wavelet derived at 305 and the wavelet at depth 307. The attenuation factor may be considered to be a parameter characteristic of the earth formation.

Figure 7:
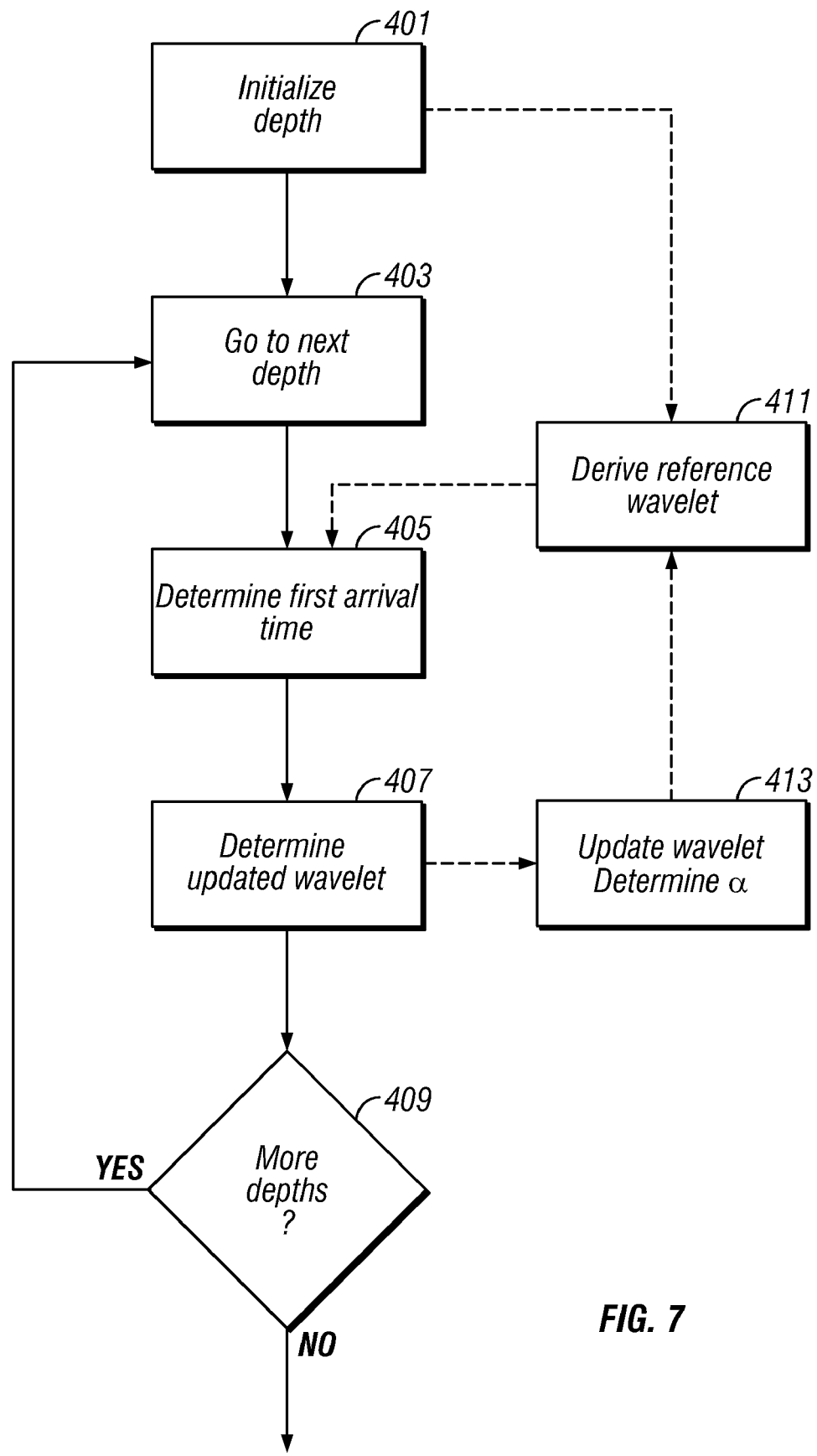
FIG. 7 is a flow chart illustrating a second embodiment of the present invention.

The process described above is then repeated at other depths such as 309 . . . 311 so that first arrival times and attenuation factors can be obtained using wavelets measured at shallower depths The process of determining first arrival times is schematically illustrated in FIG. 7. As shown in FIG. 7, at the initial depth 401, the reference wavelet (signal) is determined 411. An initial value of a may also be determined at this point. This reference wavelet is then used, at the next depth 403, to determine a first arrival time 405. Once the arrival time at depth 403 is established, by proper windowing an updated wavelet 407 is obtained. If the drilling of the well is continued 409, the process is repeated starting at 403 with the updated wavelet 407 serving as the new reference wavelet 411. An attenuation factor a may also be determined 413. As would be known to those versed in the art, in most cases of practical interest, the direct arrival occurs within ten seconds of activation of a seismic source at the surface.

In an alternate embodiment of the invention, an average value of $\alpha$ may be determined at each depth using telemetered information from the surface about the source signal. Using such telemetered information for determining an average value of $\alpha$ avoids problems that may occur when noisy wavelets at successive depths are used for determining an incremental value of $\alpha$.

The present invention has been described in the context of VSP data acquisition in which a seismic source is at or near a surface location. However, the invention could also be used when the seismic source is located in a preexisting wellbore. With such an arrangement, crosswell measurements could be made during the process of drilling a wellbore. Based on these crosswell measurements, the position of the wellbore being drilled from a preexisting wellbore can be determined and, based on the determined distance, the drilling direction of the wellbore can be controlled.

While the foregoing disclosure is directed to the preferred embodiments of the invention, various modifications will be apparent to those skilled in the art. It is intended that all such variations within the scope and spirit of the appended claims be embraced by the foregoing disclosure.

What is claimed is:

1. A system for use in seismic surveying of an earth formation, the system comprising:

(a) a controllable seismic source at a first location that is one of (i) proximate to a surface location, and (ii) at a surface location, said seismic source configured to generate a controllable seismic wave which propagates into said earth formation;

(b) a receiver on a bottomhole assembly (BHA) configured to receive a first signal comprising said propagating seismic wave;

(c) a device configured to send a second signal indicative of a character of said generated controllable seismic wave to said receiver; and (d) a processor configured to process said first signal using said second signal, the processing including generation of a vertical seismic profile indicative of a structure of the earth formation.

2. The system of claim 1 wherein said first signal includes one of i) a direct arrival, and ii) a reflected arrival.

3. The system of claim 2 wherein said processor is further configured to determine an arrival time of said direct arrival.

4. The system of claim 2 wherein said processor is further configured to determine a property of said earth formation.

5. The system of claim 4 wherein said property comprises an attenuation factor.

6. The system of claim 1 wherein said controllable seismic wave is one of i) a compressional wave, and ii) a shear wave.

7. The system of claim 1 wherein said second signal comprises a parameter of a control signal used for controlling said controllable source.

8. The system of claim 1 further comprising a reference detector which is configured to measure said propagating seismic wave and wherein said second signal is based at least in part on said measurement made by said reference detector.

9. The system of claim 1 further comprising a telemetry system configured to transmit a signal indicative of an initiation time of said seismic wave.

10. The system of claim 1 further comprising a rubidium clock configured to provide accurate timekeeping.

11. The system of claim 1 wherein (a)-(c) is repeated for a plurality of depths of said BHA.

* * * * *